United States Patent [19]

Gruber et al.

[11] 4,296,192

[45] Oct. 20, 1981

[54] ELECTROSTATOGRAPHIC TONER COMPOSITION

[75] Inventors: Robert J. Gruber, Pittsford; Steven B. Bolte, Webster; John F. Knapp, Fairport; Dale R. Ims, Webster; Richard B. Lewis, Williamson, all of N.Y.

[73] Assignee: Xerox Corporation, Stamford, Conn.

[21] Appl. No.: 54,203

[22] Filed: Jul. 2, 1979

[51] Int. Cl.$^3$ ............................................... G03G 9/00
[52] U.S. Cl. ................................... 430/109; 430/105; 430/137; 430/904
[58] Field of Search ............... 430/107, 109, 111, 137, 430/904, 105; 260/19 EP, 29.2 EP, 37 EP

[56] References Cited

U.S. PATENT DOCUMENTS

| | | | |
|---|---|---|---|
| 3,393,229 | 7/1968 | Smith | 427/127 |
| 3,679,612 | 7/1972 | Titow | 430/111 |
| 3,694,359 | 9/1972 | Merrill | 430/109 |
| 3,926,628 | 12/1975 | Honjo | 430/107 |
| 4,097,620 | 6/1978 | Lu | 260/486 |

*Primary Examiner*—Mary F. Downey
*Attorney, Agent, or Firm*—E. O. Palazzo; R. A. Girloch

[57] ABSTRACT

An electrostatographic toner composition including a colorant and polyether polymer of a dihydric phenol and an alkylene ether glycol.

6 Claims, No Drawings

ELECTROSTATOGRAPHIC TONER COMPOSITION

BACKGROUND OF THE INVENTION

This invention relates to toner compositions for use in developing latent electrostatographic images and more particularly to toner compositions which exhibit long life in the electrostatographic process.

In the development of electrostatographic images, a toner composition is mixed with a carrier composition in order to impart the proper charge characteristics to the toner particles and also for the purpose of carrying the toner particles by a physical means to the surface which contains the latent electrostatic image. The carrier particles are generally much larger in particle size than that of the toner varying from perhaps 5 to 100 times larger depending upon the particular developer being employed. The toner is thus subjected to large forces in the development housing and in transit toward the imaging surface, which forces result in the particle size reduction of the toner particles. This creates problems because it not only provides a source for dirt made up of the fine toner particles but also changes the triboelectric character of the toner particles because of the reduction in size thereof and the impaction and adhesion to the carrier particles. On the other hand, for economic reasons it is desired to use customary particle size reduction techniques to achieve the desired particle size of the colorant filled resinous materials. Uniformity in particle size can be achieved subsequent to size reduction by standard classification methods. A problem encountered because of these objectives is that particle size reduction will also occur in the electrostatographic apparatus because the conditions therein are similar to that encountered in the size reduction apparatus. Thus, brittle failure of the toner particles together with size reduction occurs in the electrostatographic process. This size reduction during the electrostatographic process results in changes in both the triboelectric and charging characteristics of the toner particles with respect to the particular carrier materials employed in the process. That is, as the particle size reduction of the toner particles occurs, the charge to mass ratio on the particles increases thereby increasing the forces holding the size reduced toner particles to the carrier particles. This results in even more harsh impacts between the large size carrier particles and the toner particles either causing further reduction in the particle size or flattening of the particles out in a pancake fashion which tightly adhere to the surface of the carrier particles eventually resulting in reduction in the triboelectric characteristics.

PRIOR ART STATEMENT

The following prior art appears to be relevant: U.S. Pat. No. 3,393,229 issued July 16, 1968 to Carl M. Smith relates to polyethers, which are useful as prepolymers, of five to fifty-fold oxa-substituted aliphatic polyols etherified at 2 to 3 hydroxyl positions with functionally substituted phenolic aromatic compounds.

U.S. Pat. No. 4,097,620 entitled "Magnetic Toner Particle Coating Process", issued June 27, 1978 to Chin H. Lu, discloses many resins for preparing toner, "modified epoxy resins" being named at col. 8, line 4.

SUMMARY OF THE INVENTION

In accordance with the invention, there is provided a toner composition comprising a colorant and a resin, the resin being a polyether polymer comprising the repeating units

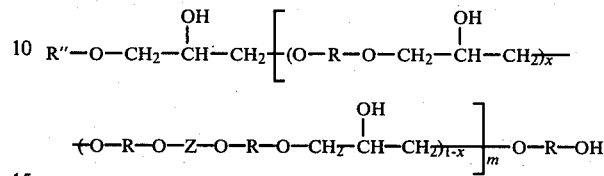

where R is the residue remaining after the removal of the hydroxyl groups from a dihydric phenol, R" is alkyl or aryl, such as, ethyl, propyl isopropyl, butyl, phenyl, tolyl and the like, Z is the residue remaining after the removal of the hydroxyl groups from an alkylene ether glycol of the formula $$HO+CH_2-\underset{R'}{CH}-O)_n H,$$

where R' is hydrogen or methyl and n is an integer having a value of 2 to 4 and m is a value such that the polyether polymer has a reduced viscosity when measured in tetrahydrofurane at 0.4 gram per deciliter, between about 0.2 to about 0.6, preferably about 0.25 to about 0.35 and a glass transition temperature between about 40° C. and about 65° C.

Reduced viscosities are calculated using the following relationship:

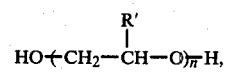

where
$t_s$=elution time for the solution
$t_o$=elution time for the solvent
c=polymer concentration in gm/dl.

The solvent used for the measurements is tetrahydrofurane. The concentration is 0.4 gm/dl. The elution times are measured with a size 75 Cannon Dilution Ubbelohde viscometer in a constant temperature water bath at 25° C.

The polymer should have a suitable molecular weight such that when toner size particles are prepared, they will have sufficient toughness to withstand the vigorous environment within an electrostatographic apparatus, while at the same time exhibit the rheological properties that prevents blocking under storage and transport conditions but can be readily fixed to paper substrates by normal fusing conditions.

The toughness of the toner size particles can readily be determined by simulating conditions in an electrostatographic machine. This can be done in a roll mill wherein the resin powder is rolled with a carrier material over a period of time and by visual observation of the toner particles under a scanning electron microscope.

The blocking characteristics of the resin can be determined by measurement of the second order glass transition temperature. The glass transition temperature is measured in a Differential Scanning Calorimeter. This generally should be as high as possible without interfering with the fusing requirements. The second order glass transition temperature should preferably be from about 40° to 65° C. at a heating rate of 10° C. per minute in a differential scanning calorimeter. Preferably, the glass transition temperature should be from about 50° C. and about 65° C.

The fusing characteristics can be determined simply by placing particles of the toner size resin particles on a glass slide in an oven preheated to 135° C. for two minutes. The particles if satisfactory for toner, will coalesce within this time.

In a specific test for toughness of the resin, six grams of resin powder made up of resin particles having a size of from about 10 to 15 microns are rolled in a glass jar of 473 cubic centimeters at a rate of 27.5 linear meters per minute with 500 grams of 250 micron coated glass beads having a density of about 4.2 grams per cubic centimeter, which are uniformly coated to a thickness of from 0.25 to 1 micron with a copolymer of 48 mol percent chlorotrifluoroethylene and 52 mol percent of vinyl chloride sold by Firestone Plastics Company under the designation FPC-461. Samples are withdrawn periodically and the resin powder is blown off the coated glass beads with an airstream at a pressure of 4.57 kilograms per square centimeter.

The blown off powder is viewed under a scanning electron microscope and a comparison is made with the original particles. The longer the rolling test can be conducted without a difference being observed, the tougher is the resin. That is, one viewing the resin particles after the rolling test should be unable to detect any substantial number of particles which have cracks or have been reduced in particle size because of brittle failure caused by impaction with the high density glass beads.

The rolling test, set forth above can also be used in conjunction with a test for resin powder concentration and charge to mass ratio. In this test, the rolled resin particles and carrier particles are placed in a Faraday Cage and dry compressed air is blown through the cage under a pressure of 4.57 kg/cm$^2$ in order to remove all of the resin particles capable of being removed from the coated glass beads. A Faraday Cage is a device which consists of a brass cylinder having a diameter of 2.54 cm and a length of 2.54 cm. A 100 mesh screen is positioned at each end of the cylinder. The cylinder is weighed, charged with 0.5 grams of the above stated mixture and connected to ground through a capacitor and an electrometer connected in parallel. In addition to the determination of the resin concentration or the weight loss by impaction on the glass carrier beads, this device also is used to determine the charge on the particles in microcoulombs per gram of resin powder. The weight loss of the resin sample can occur by two modes of resin particle failure, either of which will be determined by the tests set forth above. First, the particles can fail by brittle fracture, thereby causing the attrition of the resin particles with the accompanying reduction in the mass of the resulting particles. This reduction in mass corresponds to an increase in the charge to mass ratio, thereby increasing the attractive forces between the coated glass beads and the size reduced resin particles. As the charge to mass ratio on the resin powder particles increases above 40 microcoulombs per gram, the attractive forces between the particles become so great that the resin particles and the glass bead particles become difficult to separate with the high pressure air passing through the Faraday Cage.

Secondly, the resin particles can fail because of ductile deformation. In this mode of failure, the resin particles become flattened against the surface of the larger high density glass beads in a pancake type formation. In such action, the particles literally become welded to the surface of the glass beads thus preventing blowoff and recovery of the toner particles. It can be seen that the tests indicated above, that is, the visual observation of the toner particles by scanning electron microscope and also the measurement of the recoverable toner after blowoff gives a precise test for determining whether a resin material will have the proper physical characteristics to withstand the forces involved in the normal operation of an electrostatographic apparatus.

In accordance with this invention, any suitable polyether polymer having the formula set forth above may be used. In the formula R represents the residue remaining after removal of the hydroxyl groups from a dihydric phenol such as, for example, 2,2-bis-(4-hydroxyphenyl)-propane or (bisphenol-A); 2,4'-dihydroxydiphenylmethane; bis-(2-hydroxyphenyl)-methane; bis-(4-hydroxyphenyl)-methane; bis-(4-hydroxy-5-nitrophenyl)-methane; bis-(4-hydroxy-2,6-dimethyl-3-methoxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane; 2,2-bis-(3-phenyl-4-hydroxyphenyl)-propane; 2,2-bis-(3-isopropyl-4-hydroxyphenyl)-propane; 2,2-bis-(4-hydroxynaphthyl)-propane; 2,2-bis-(4-hydroxyphenyl)-pentane; 3,3-bis-(4-hydroxyphenyl)-pentane; 2,2-bis-(4-hydroxyphenyl)-heptane; bis-(4-hydroxy-phenyl)-phenyl methane; bis-(4-hydroxyphenyl)-cyclohexyl methane; 1,2-bis-(4-hydroxyphenyl)-1,2-bis-(phenyl) ethane; 2,2-bis-(4-hydroxyphenyl)-1,3-bis-(phenyl) propane; 2,2-bis-(4-hydroxyphenyl)-1-phenyl propane; dihydroxybenzenes such as hydroquinone and resorcinol, dihydroxydiphenyls such as 4,4'-dihydroxydiphenyl; 2,2'-dihydroxydiphenyl; 2,4'-dihydroxy-diphenyl; dihydroxynaphthalenes such as 2,6-dihydroxynaphthalene; dihydroxy aryl sulfones, such as bis-(4-hydroxyphenyl)-sulfone; 2,4'-dihydroxydiphenyl sulfone; 5'-chloro-2,4'-dihydroxydiphenyl sulfone; 5'-chloro-2'4-dihydroxydiphenyl sulfone; 3'-chloro-4, 4'-dihydroxydiphenyl sulfone; bis-(4-hydroxyphenyl) biphenyl disulfone; dihydroxy aromatic ethers, such as 4,4'-dihydroxydiphenyl ether; 4,4'-dihydroxytriphenyl ether; the 4,3'-4,2'-, 3,3'-, 2,2'-2,3'-, etc. dihydroxydiphenyl ethers; 4,4'-dihydroxy-2,5-dimethyldiphenyl ether; 4,4'-dihydroxy-2,6-dimethyldiphenyl ether; 4,4'-dihydroxy-3,3'-di-isobutyldiphenyl ether, 4,4'-dihydroxy-3,3'-diisopropyldiphenyl ether; 4,4'-dihydroxy-3,2'-dinitrodiphenyl ether; 4,4'-dihydroxy-3,3'-dichlorodiphenyl ether; 4,4'-dihydroxy-3,3'-difluorodiphenyl ether; 4,4'-dihydroxy-2,3'-dibromodiphenyl ether; 4,4'-dihydroxydinaphthyl ether; 4,4'-dihydroxy-3,3'-dichlorodinaphthyl ether; 2,4'-dihydroxytetraphenyl ether; 4,4'-dihydroxypentaphenyl ether; 4,4'-dihydroxy-2,6-dimethoxydiphenyl ether; 4,4'-dihydroxy-2,5-diethoxydiphenyl ether, etc. Mixtures of the dihydric phenols can also be employed and where dihydric phenol is mentioned herein, mixtures of such materials are considered to be included. Bisphenol A is the preferred material.

Z represents the residue remaining after the removal of the hydroxyl groups from a polyalkylene ether glycol represented by the formula, such as, for example, diethylene glycol, triethylene glycol, tetraethylene glycol, di-1,2-propylene glycol, tri-1,2-propylene glycol, tetra 1,2 propylene glycol and the like.

In the preparation of the polyether polymers for use in the manufacture of toner compositions, the alkylene ether glycol is first converted to the disulfonate ester by reaction with benzene sulfonyl chloride in the presence of triethylamine, a solvent such as toluene and under a nitrogen blanket. The benzene sulfonyl chloride is added slowly to the polyalkylene ether glycol, triethylamine and toluene at about 0° C. At the completion of addition the temperature is permitted to rise to room temperature with stirring overnight. The product is separated and reacted with a dihydric phenol in the presence of a slight excess of a strong base such as, sodium hydroxide, potassium hydroxide, sodium ethoxide and the like to the intermediate by linking together two dihydric phenol molecules with the polyalkylene ether glycol residue.

This product can then be reacted with epichlorohydrin in the normal fashion of preparing epoxy resins to obtain the polyether polymer suitable for the preparation of toner compositions. The general method described in U.S. Pat. No. 3,393,229 may be used to prepare the polyethers suitable herein.

In the preparation of the polymer, the dihydric phenol, polyalkylene ether glycol and epichlorohydrin are reacted in the mol percentage range of from about 50:10:40 to about 50:25:25 mol percent respectively and preferrably in the range of from about 50:14:36 to about 50:21:29 mol percent respectively.

It is also preferred that the polyalkylene ether glycol be used in an amount such that the weight percent of unit Z (residue remaining after removal of the hydroxyl groups from a polyalkylene ether glycol) be from about 10 to about 20 weight percent and preferably from about 12 to 16 percent.

The toner forming polymers have a reduced viscosity between about 0.2 to about 0.6, (THF/25° C./0.4 gm/dl.), Tg between about 40° to about 65° C.

In the practice of this invention, the toner materials may be prepared by dissolving the polyether polymer and a coloring agent such as a dye or a pigment or by dissolving the polymer and dispersing the colorant, should it be insoluble, in a suitable solvent and spray drying to achieve uniformly sized toner particles. The toner size may vary from about 1 micron to about 20 microns and preferably from about 10 to about 15 microns. The toner particles will be of substantially uniform size because of the nature of the spray drying operation.

In the preparation of the toner material, any suitable colorant may be employed such as, for example, pigments or dyes including, carbon black, nigrosine dye, aniline blue, Calco Oil Blue, chrome yellow, Ultramarine blue, DuPont Oil Red, Quinoline Yellow, methylene blue chloride, phthalocyanine blue, Malachite Green Oxylate, lamp black, Rose Bengal and other pigments and dyes set forth in the Color Index, Vols. I and II, Second Edition. Should a magnetic toner be desired, the colorant may be a magnetic material such as iron particles, iron oxide, nickel, ferrite, magnetite, or mixtures of magnetic particles and colorant.

In the preparation for spray drying, the resinous material employed and the colorant is dissolved or dissolved and dispersed in any suitable solvent such as, for example, chlorinated solvents including trichloroethylene, methylene chloride, tetrachlorethylene, methylene dichloride, chloroform, aromatic solvents such as toluene, benzene, naphthalene, xylene, ketones such as, for example, methylethyl ketone, acetone, esters such as ethylacetate, amylacetate, mixtures thereof and the like. The solvent should be chosen in order to assure that all the resin components are soluble.

The spray drying operation may be conducted in a suitable spray drying apparatus such as, for example, the Bowen Laboratory Spray Dryer manufactured by Bowen Engineering Corporation, North Branch, New Jersey. This unit is a lab size conical dryer with concurrent airflow and has an interchangable atomizing head mounted near the top of the drying chamber. Any suitable atomizing head may be employed such as, for example rotating disk, high pressure nozzles, and the like. In order to achieve uniformity in size of the particles, it may be desirable to classify the particles by any suitable classification techniques well known in the classification art.

The toners of this invention can be mixed with a suitable carrier to form electrostatographic developers. Any suitable carriers having a particle size of from about 30 microns to about 1,000 microns may be employed such as, for example, the glass beads, sand, particles of ferromagnetic materials such as iron, cobalt, nickel, alloys thereof, ferrites, and the like. Resinous materials such as methylmethacrylate, styrene and any suitable resinous materials in particle sizes set forth above may also be used. The carriers may be employed with or without a coating. Many suitable resinous coating materials may be employed such as polymeric styrene, polymethylmethacrylate, the particular coating composition indicated above for use with the test carrier, and any of the suitable terpolymers set forth in U.S. Pat. No. 3,526,533. Many of the foregoing and other typical carriers are described in U.S. Pat. Nos. 2,638,416; 2,618,552 and 4,075,391. It is preferred that the carrier be chosen in order that the charge to mass ratio of the blownoff toner is from about 10 to about 40$\mu$ coulombs/gram and most preferably from about 10 to 30 $\mu$c/gm.

The toner composition generally comprises from about 0.1 to about 15 percent by weight of the total toner carrier weight. Preferably, the toner is present in an amount of from about 0.5 to 5 percent by weight based on the total weight of the developer mixture.

In addition to the presence of toner and carrier, because the toner particles are prepared by spray drying, it is generally preferred to add a flow agent to the developing mixture in order to obtain the optimum flow characteristics of the toner in the electrostatographic system. Any suitable flow agent such as, for example, colloidal silica, aluminum oxide, titanium dioxide, talc and the like may be employed. These flow aids are sub-micron in size and preferably from about 50 Å to about 500 Å microns. The flow agents are added in an amount of from about 0.05 to about 1% based on the weight of the toner, and preferably from about 0.1 to about 0.5%.

The invention is further illustrated by the following examples in which parts and percentages are by weight unless otherwise specified:

EXAMPLE I

Preparation of Bis-Sulfonate Ester of Tetraethylene Glycol

To a three-necked flask, fitted with a condenser, mechanical stirrer, thermometer and dropping funnel is charged about 325.43 parts (3.216 mol) of triethylamine, about 295.23 parts (1.52 mol) of freshly distilled tetraethylene glycol and about 400 parts by volume of toluene under a nitrogen blanket. The solution is cooled to 0° C. with a water acetone ice bath and to this is added dropwise about 565.22 parts (3.2 mol) of freshly distilled benzene sulfonyl chloride over a 7 hour period. Temperature during addition is maintained between about 0° and about 3° C. At the end of the addition it is allowed to warm up to room temperature with stirring overnight. The mixture is then cooled to about 3° C., and filtered. The white filter cake (triethylamine hydrochloride) is washed with about 600 parts by volume of methylene chloride and the combined filtrates reduced under water aspirator vacuum at about 45° to a heavy syrup. This is then redissolved in 500 parts by volume of methylene chloride and washed with deionized water until the water washings are neutral. After drying with anhydrous magnesium sulfate, the methylene chloride and remaining toluene are evaporated under initially a water aspirator vacuum at about 45° C., then with oil pump (about 0.1 mm) at about 50° for about 20 hours. This gives about 618 parts (86%) of a light amber viscous syrup. Analysis calculated for $C_{20}H_{26}O_9S_2$:C, 50.62; H, 5.52; S, 13.51. Found C, 50.89; H, 5.45; S, 13.35; Cl, 0.38; N, 0.036. IR shows no evidence of hydroxyl group.

Preparation of Polyglycidyl Ether

In three-necked flask fitted with a water condenser, mechanical stirrer, thermometer, and a dropping funnel is placed about 91.32 parts (0.4 mol) of bisphenol A, about 105 parts by volume (0.21 mol) of a 2.3 N sodium ethoxide solution and about 50 parts by volume of ethanol under a nitrogen blanket. The above mixture is then heated to reflux (83° C.) to which is added drop-wise about 47.46 parts (0.1 mol) of the bis-sulfonate ester of tetraethylene glycol prepared above, over a two hour period. Reflux with stirring is continued for additional six hours, then at room temperature for 16 hours. At this point, the reaction mixture is creamy white and to which is added about 11.6 parts (0.29 mol) of sodium hydroxide dissolved in about 80 parts by volume of deionized water. After about two hours about 27.76 (0.3 mol) of freshly distilled epichlorohydrin is added and stirred at room temperature for about 21.5 hours. At this point, the reaction mixture looks like curdled milk and about 1.8 parts (0.045 mol) of sodium hydroxide dissolved in 30 parts by volume of deionized water are added. Heat is applied, and at the point of reflux (80° C.) 24 parts by volume of toluene are added giving rise to a creamy white mixture. After about one hour the mixture appears doughy and about 15 parts by volume of toluene are added. After an additional hour at reflux, another 15 parts by volume of toluene are added and continued with increased stirring rate. At this point the mixture is very doughy, and about 1.5 parts of phenol dissolved in about 10 parts by volume of toluene are added. Reflux is continued for an additional two hours, then cooled to room temperature.

The resulting white soft doughy polymer mixture is diluted with about 300 parts by volume of deionized water and stirred for 10 minutes. The water is removed by decanting and repeated three more times. To this is added about 300 parts by volume of chloroform and about 100 parts by volume of isopropanol and stirred until completely dissolved. It is then washed with about 2000 parts by volume of deionized water containing about 8 parts by volume of conc. $H_3PO_4$, followed by deionized water until the water washings are neutral. Isopropanol is added during each wash to improve separation.

The remaining chloroform mixture is evaporated under reduced pressure at about 60° C. for 5 days. The resulting polymer is almost colorless, exhibiting a Tg of 59° C.

The thus prepared resin is dissolved in chloroform and spray dried to form particles of from 10 to 15 microns. A small quantity of the particles are sprinkled onto a glass slide and placed in an oven preheated to 135° C. for two minutes. The particles coalesce during the two minutes.

A six gram sample of the powdered polyethylene polymer prepared as above is tested in accordance with the roll mill test described above. After 500 hours, the particles are viewed under a scanning electron microscope. No particle failure can be observed. Substantially 100% of the particles are recovered after blowoff.

The resin and about 10% carbon black is spray dried from a chloroform solution to prepare toner particles having a number average particle size of about 7 microns and a volume average particle size of about 11 microns. The toner is blended with about 0.25 percent hydrophobic fumed silica in a Lodige Blender.

A development system is prepared using about one percent of the blended toner composition with 100 micron ferrite particles prepared in accordance with Example III of U.S. Pat. No. 4,075,391, coated with about 1.2 percent, based on the weight of the ferrite, of the same copolymer employed for coating the glass beads of the previously described roll mill test, the coating containing about 25% acetylene black.

When used in an electrostatographic copier having a magnetic brush development system, no visible change is discerned in copy quality after 100,000 copies and no failure of toner particles is observed under scanning electron microscope.

EXAMPLE II

The procedure of Example I is repeated except that the bis-sulfonate ester of diethylene glycol is prepared by substituting about 161.12 parts (1.52 mol) of diethylene glycol for the tetraethylene glycol.

Also, in the preparation of the polyglycidyl ether, about 38.6 parts (0.1 mol) of the bis-sulfonate ester of diethylene glycol is used in place of the bis-sulfonate ester of tetraethylene glycol.

Toner particles are prepared from this polyether and mixed with the same carrier particles to form an electrostatographic developer in the same manner as in Example I. When used in a xerographic machine equipped with a magnetic development subassembly, excellent copy quality over long periods of time are obtained.

EXAMPLES III–VII

The procedure of Example I is repeated utilizing the same reactants in the mol quantities set forth in the following table, the polymer formed exhibits the second order glass transition temperature expressed in column 5.

| EX. | MOLS | | | Tg °C. | REDUCED VISCOSITY |
|-----|------|------|------|------|------|
|     | Sulfonate Ester Z | Epichloro-hydrin | Diphenol R | | |
| III | 0.21 | 0.29 | 0.50 | 41 | 0.33 |
| IV  | 0.18 | 0.32 | 0.50 | 45 | 0.26 |
| V   | 0.16 | 0.34 | 0.50 | 52 | 0.48 |
| VI  | 0.15 | 0.35 | 0.50 | 54 | 0.32 |
| VII | 0.14 | 0.36 | 0.50 | 56 | 0.30 |

These resins prepared by utilizing the reactants in the molar quantities indicated are prepared into toner particles and developer compositions as in Example I. These toner materials all exhibited satisfactory performance in an electrostatographic machine over extended periods of time.

What is claimed is:

1. An improved electrostatographic toner composition comprised of a resin, and a colorant, the resin consisting essentially of a polyether polymer resulting from the reaction product of 50 mol percent of a dihydric phenol, containing about 10 to 25 mol percent of a polyalkylene ether glycol selected from the group consisting of diethylene glycol, triethylene glycol, tetraethylene glycol, di-1,2-polylene glycol, tri-1,2-propylene glycol, and tetra 1,2-propylene glycol, and about 40 mol percent to about 25 mol percent of epichlorohydrin.

2. An improved electrostatographic toner composition in accordance with claim 1 wherein the dihydric phenol is bisphenol A, and the polyalkylene ether glycol is diethylene glycol or tetraethylene glycol.

3. An improved electrostatographic toner composition in accordance with claim 1 wherein the resin is a copolymer of styrene and n-butyl methacrylate, the colorant is carbon black, the dihydric phenol is bisphenol-A and the polyalkylene ether glycol is diethylene glycol or tetraethylene glycol.

4. An improved toner composition in accordance with claim 1 wherein 14 mol percent to 21 mol percent of the dihydric phenol is present, and from about 36 to 29 mol percent of the polyalkylene ether glycol is present.

5. An improved electrostatographic toner composition in accordance with claim 1 wherein the polyether polymer is a polyglycidyl ether, resulting from the reaction product of bisphenol-A, tetraethylene glycol, and epichlorohydrin.

6. An improved electrostatographic toner composition in accordance with claim 1 wherein the polyether polymer is a polyglycidyl ether, resulting from the reaction product of bisphenol-A, diethylene glycol, and epichlorohydrin.

* * * * *